US009223168B2

(12) United States Patent
You et al.

(10) Patent No.: US 9,223,168 B2
(45) Date of Patent: Dec. 29, 2015

(54) PDLC FILM STRUCTURE, MANUFACTURING METHOD AND CONTROLLING METHOD THEREOF

(71) Applicant: BOE Technology Group Co., Ltd., Beijing (CN)

(72) Inventors: Jaegeon You, Beijing (CN); Miki Kashima, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 56 days.

(21) Appl. No.: 14/049,332

(22) Filed: Oct. 9, 2013

(65) Prior Publication Data

US 2014/0098316 A1    Apr. 10, 2014

(30) Foreign Application Priority Data

Oct. 9, 2012    (CN) .......................... 2012 1 0378891

(51) Int. Cl.
*G02F 1/1343* (2006.01)
*G02F 1/136* (2006.01)
*G02F 1/1333* (2006.01)
*G02F 1/1334* (2006.01)
*G02F 1/1362* (2006.01)

(52) U.S. Cl.
CPC .......... *G02F 1/1334* (2013.01); *G02F 1/13624* (2013.01); *G02F 1/134363* (2013.01); *G02F 2201/121* (2013.01); *G02F 2201/124* (2013.01)

(58) Field of Classification Search
CPC combination set(s) only.
See application file for complete search history.

(56) References Cited

U.S. PATENT DOCUMENTS 6,791,658 B2    9/2004    Maruyama et al.
2010/0134707 A1*    6/2010    Kim et al. ....................... 349/37

FOREIGN PATENT DOCUMENTS

KR    20040074496 A    8/2004

OTHER PUBLICATIONS

First Office Action issued by the Chinese Patent Office for Chinese Patent Application No. 201210378891.5 dated Aug. 4, 2014, 7pgs.
English translation of First Office Action issued by the Chinese Patent Office for Chinese Patent Application No. 201210378891.5 dated Aug. 4, 2014, 5pgs.

* cited by examiner

*Primary Examiner* — Wen-Ying P Chen
(74) *Attorney, Agent, or Firm* — Ladas & Parry LLP (57) ABSTRACT

A PDLC film structure, a manufacturing method and a controlling method thereof are provided. The PDLC film structure comprising: a first substrate and a second substrate disposed facing each other; and a PDLC layer filled between the first substrate and the second substrate. A transparent electrode is provided on a surface of the first substrate which faces the second substrate, and a plurality of control units are provided on a surface of the second substrate which faces the first substrate, each control unit comprising a first thin film field effect transistor and a first transparent electrode connected thereto, and a second thin film field effect transistor and a second transparent electrode connected thereto.

12 Claims, 6 Drawing Sheets

PDLC FILM STRUCTURE, MANUFACTURING METHOD AND CONTROLLING METHOD THEREOF

CROSS REFERENCE TO RELATED APPLICATIONS

This application claims priority from Chinese National Application No. 201210378891.5 filed on Oct. 9, 2012, the contents of which are incorporated herein by reference.

BACKGROUND

Embodiments of the disclosed technology relates to a PDLC film structure, a manufacturing method and a controlling method thereof.

Polymer-dispersed liquid crystal (PDLC) is a kind of material which has a polymer matrix with liquid crystal micron droplets uniformly dispersed therein and is obtained by a polymerization reaction after low-molecular liquid crystal is mixed with a prepolymer. This material can achieve an electro-optical response characteristic by using the anisotropy of the liquid crystal molecules without requiring a polarization board and an alignment layer. A PDLC film largely depends on the match between the effective refractive index of the liquid crystal molecules and the polymer matrix.

When a conventional PDLC film prepared with positive liquid crystals is not applied with a voltage, the liquid crystal molecules are randomly oriented, so that the incident light is repeatedly refracted and reflected at the interfaces between the liquid crystal molecules and the polymer matrix, thereby exhibiting a milky scattering state. When a voltage is applied, the liquid crystal molecules are arranged along the direction of the electric field, so that the incident light is not refracted and reflected but is transmitted out.

Typically, a ratio of the amount of the transmitted light corresponding to the liquid crystal molecules in the current positions to the amount of the transmitted light corresponding to the liquid crystal molecules in the final positions is called a transmittance. The time required by changing a 10% transmittance to a 90% transmittance when the liquid crystal device is turned on is called a rise time, and the time required by changing a 90% transmittance to a 10% transmittance when the liquid crystal device is turned off is called a fall time, and the total response time of the liquid crystal is the sum of both. For a PDLC film, the impact on its response time has many factors, which not only relates to polymeric material selection, concentration ratio before the polymerization, and the polymerization process conditions, but also relates to shape, frequency, amplitude of the driving pulse during normal working of the resultant film, thus, to some extent, resulting in a variety of materials with different response times of long or short. But fundamentally speaking, the response time of a PDLC film is determined by an anchoring energy of polymer matrix on the liquid crystal molecules and the intensity of the electric field where the liquid crystal is located. In general, in case of a lower anchoring energy of the polymer matrix on the liquid crystal molecules, there is a contradictory relationship in which the PDLC film has a short rise time but a long fall time (and vice versa).

In the related art, the commonly used PDLC film has a larger liquid crystal ratio with a larger liquid crystal mesh, which in turn leads to a lower anchoring energy of the polymer matrix on the liquid crystal molecules in the PDLC film. That is, the PDLC film has a short rise time but a long fall time, i.e., when a voltage is applied to the PDLC film, the liquid crystal molecules rotate to the electric field direction faster, but when the voltage application is stopped, the liquid crystal molecules are returned from the electric field direction to the state before application of voltage slowly.

SUMMARY

On embodiment of the invention provides a polymer dispersed liquid crystal (PDLC) film structure, comprising: a first substrate and a second substrate disposed facing each other; and a PDLC layer filled between the first substrate and the second substrate, wherein a transparent electrode is provided on a surface of the first substrate which faces the second substrate, and a plurality of control units are provided on a surface of the second substrate which faces the first substrate, each control unit comprising a first thin film field effect transistor and a first transparent electrode connected thereto, and a second thin film field effect transistor and a second transparent electrode connected thereto.

Another embodiment of the invention provides a manufacturing method of a polymer dispersed liquid crystal (PDLC) film structure, comprising: forming a transparent electrode on a first substrate; forming a plurality of control units on a second substrate, each control unit comprising: a first thin film field effect transistor and a first transparent electrode connected thereto, and a second thin film field effect transistor and a second transparent electrode connected thereto; disposing the first substrate and the second substrate so that a surface of the first substrate provided with the transparent electrode faces a surface of the second substrate provided with the control units, and filling a PDLC layer between the first substrate and the second substrate.

Still another embodiment of the invention provides a controlling method of the polymer dispersed liquid crystal (PDLC) film structure according to claim 1, wherein the method comprising: upon the PDLC film structure being turned on, applying a voltage to the first transparent electrode through the first thin film field effect transistor so that the first transparent electrode has a first polarity, applying a voltage to the second transparent electrode through the second thin film field effect transistor so that the second transparent electrode has the first polarity, and applying a voltage to the first substrate so that the transparent electrode thereon has a second polarity which is opposite to the first polarity; and upon the PDLC film structure being turned off, applying a voltage to the first transparent electrode through the first thin film field effect transistor so that the first transparent electrode has the first polarity, applying a voltage to the second transparent electrode through the second thin film field effect transistor so that the second transparent electrode has the second polarity, thereby causing liquid crystal molecules in the PDLC layer to return to a scattering state.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 3 is an operation principle diagram of a PDLC film structure provided by an embodiment of the present invention upon the PDLC film structure being turned on;

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a polymer dispersed liquid crystal (PDLC) film structure having a first substrate and a second substrate which are disposed facing each other with a PDLC layer filled therebetween. A transparent electrode is provided on a surface of the first substrate facing the second surface. In the PDLC film structure according to the embodiment of the present invention, a plurality of control units are provided on a surface of the second substrate facing the first substrate, and each control unit includes a first thin film field effect transistor (TFT) and a first transparent electrode connected thereto, and a second thin film field effect transistor and a second transparent electrode connected thereto. The control units are configured so that, upon the PDLC film structure being turned on, the first transparent electrode and the second transparent electrode are controlled to have a same polarity, which is opposite to that of the transparent electrode on the first substrate, by using the first thin film filed effect transistor and the second thin film field effect transistor, respectively; and upon the PDLC film structure being turned off, the first transparent electrode and the second transparent electrode are controlled to have different polarities by using the first thin film filed effect transistor and the second thin film field effect transistor, respectively, causing liquid crystal molecules in the PDLC layer to return to a scattering state.

For example, the first transparent electrode and the second transparent electrode are each a comb-shaped electrode, and disposed opposing to each other; the electrode lines as comb tooth portions in the first transparent electrode and the second transparent electrode are disposed to be spaced from each other.

Further, the above structure may further include alignment films which are disposed between the first substrate and the PDLC layer, and between the second substrate and the PDLC layer.

To better illustrate the above-described PDLC film structure provided by the embodiment of the invention, a specific embodiment will be described hereinafter.

Figure 1:
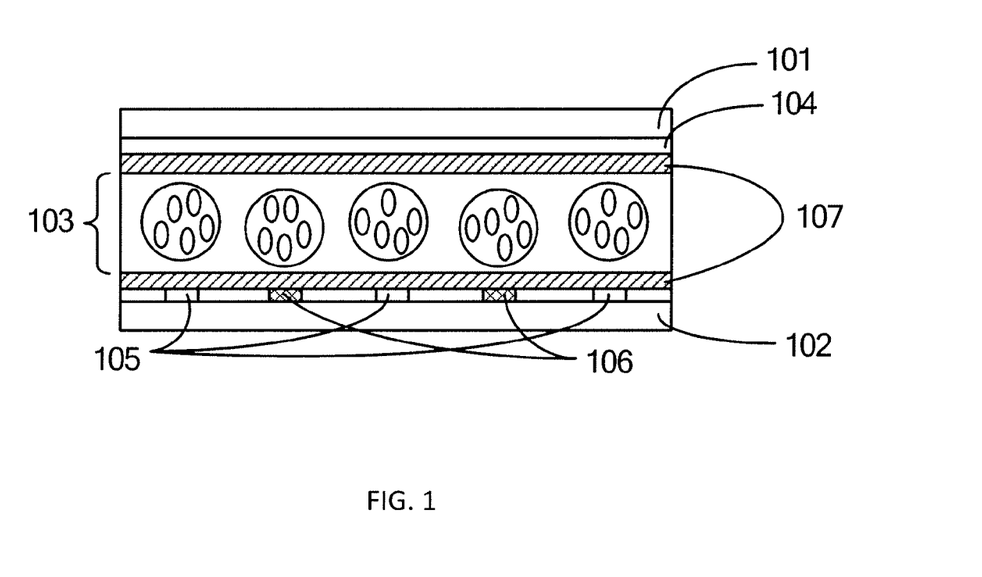
FIG. 1 is a cross-sectional view of a PDLC film structure provided by an embodiment of the present invention.

FIG. 1 is a cross-sectional view of a PDLC film structure provided by an embodiment of the present invention. As can be seen from this figure, the PDLC film structure provided by the embodiment of the invention comprises: a first substrate 101, a second substrate 102, a PDLC layer 103, a transparent electrode 104, a first transparent electrode 105, a second transparent electrode 106 and an alignment film 107.

As illustrated in FIG. 1, the first substrate 101 and the second substrate 102 are disposed facing each other with the PDLC layer 103 filled therebetween; the transparent electrode 104 is provided on the first substrate 101; and a plurality of control units are provided on the second substrate 102. Each control unit includes two thin film field effect transistors (i.e., a first thin film field effect transistor and a second thin film field effect transistor, not illustrated in the FIG. 1) and electrodes connected thereto, respectively. The first thin film field effect transistor is connected to the first transparent electrode 105, and the second thin film field effect transistor is connected to the second transparent electrode 106.

For example, the alignment films 107 are disposed between the first substrate 101 provided with the transparent electrode 104 and the PDLC layer 103, and between the second substrate 102 provided with the control units and the PDLC layer 103.

Figure 2:
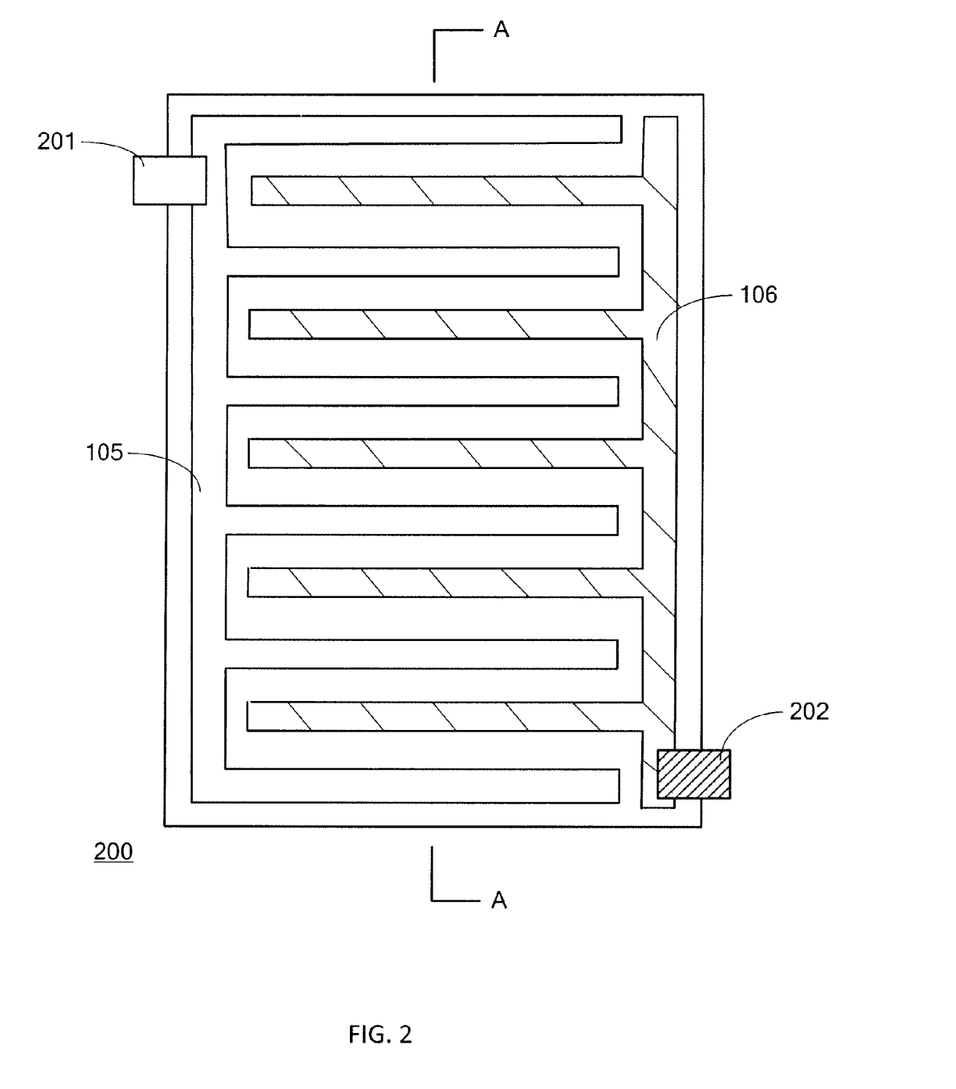
FIG. 2 is a wiring diagram of a control unit of a PDLC film structure provided by an embodiment of the present invention.

FIG. 2 is a wiring diagram of each control unit 200. FIG. 1 is a cross-sectional view of the PDLC film structure taken along the line A-A in FIG. 2.

As illustrated in FIG. 2, each control unit 200 includes: a first thin film field effect transistor 201, a first transparent electrode 105 connected to the first thin film field effect transistor 201, a second thin film field effect transistor 202 and a second transparent electrode 106 connected to the second thin film field effect transistor 202. The first transparent electrode 105 and the second transparent electrode 106 are comb-shaped electrodes, and electrode lines of the two transparent electrodes 105 and 106, which are the comb tooth portions, are alternately and separately arranged. For example, the two comb-shaped electrodes 105 and 106 are disposed opposing to each other, and the comb tooth portions of each comb-shaped electrode extends into between the comb tooth portions of the other comb-shaped electrode, as illustrated in FIG. 2. The first thin film field effect transistor 201 controls the polarity of the first transparent electrode 105, and the second thin film field effect transistor 202 controls the polarity of the second transparent electrode 106. When the first transparent electrode and the second transparent electrode have opposite polarities (e.g., the first transparent electrode has a positive polarity, and the second transparent electrode has a negative polarity), among the comb tooth portions arranged alternatively, i.e., the electrode lines of the first transparent electrode 105 and the second transparent electrode 106, a lateral electric field is generated between every two adjacent electrode lines.

Both the sectional view of FIG. 1 and the plan view of FIG. 2 illustrate only a position corresponding to only one control unit. However, the second substrate may include a plurality of control units. For example, the plurality of control units on the second substrate can be arranged in a two-dimensional matrix. Also, the transparent electrode 104 on the first substrate 101 may correspond to all of the control units 200 disposed on the second substrate 102.

For example, the first substrate 101 of the PDLC film structure further includes a power supply line thereon, which is connected to the transparent electrode 104 on the first substrate 101 so as to supply power to the transparent electrode 104. The second substrate 102 further includes a first power supply line and a second power supply line, which are connected to the source electrodes of the first thin film field effect transistor and the second thin film field effect transistor, respectively, and the drain electrodes of the first thin film field effect transistor and the second thin film field effect transistor are connected to the first transparent electrode 105 and the second transparent electrode 106, respectively. Therefore, the first power supply line and the second power supply line may supply power to the first transparent electrode 105 and the second transparent electrode 106. The second substrate 102 further includes a first gate line and a second gate line, which are connected to the gate electrodes of the first thin film field effect transistor and the second thin film field effect transistor, respectively, so as to control the switching state of the two transistors.

For example, the power supply line on the first substrate 101 and the first power supply line and the second power supply line on the second substrate 102 are each capable of supplying a positive and a negative voltage.

Next, the operation principle of the PDLC film structure provided in the embodiment of the present invention will be briefly described.

With respect to the PDLC film structure, when it is turned on, liquid crystal molecules in the PDLC layer correspond to a transmission state. At this time, the liquid crystal molecules are aligned along a direction perpendicular to the substrates, and the light transmittance reaches to a maximum value; when it is turned off, the liquid crystal molecules in the PDLC layer correspond to a scattering state. At this time, few liquid crystal molecules in the PDLC layer are aligned along the direction perpendicular to the substrates, and most of them are aligned along other directions except the direction perpendicular to the substrates.

Figure 3:
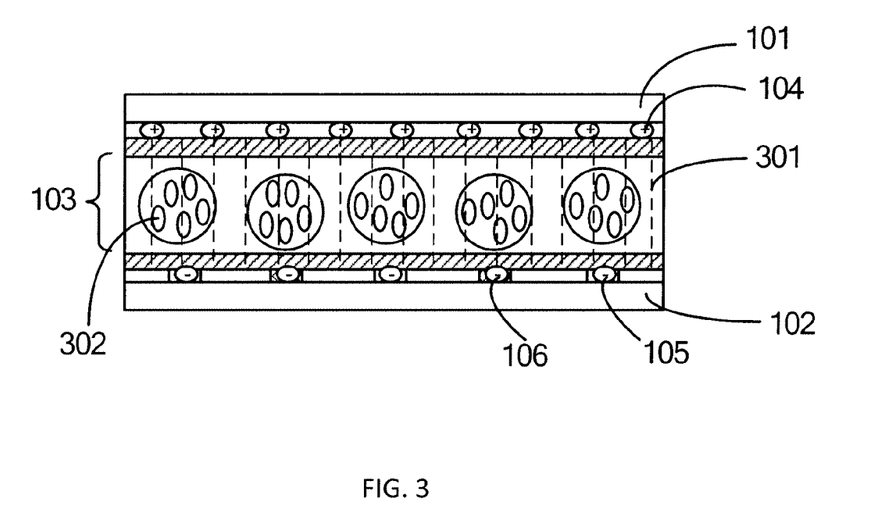

When the PDLC film structure is turned on, as illustrated in FIG. 3, each control unit controls the first transparent electrode 105 and the second transparent electrode 106 to have the same polarity by using the first thin film field effect transistor and the second thin film field effect transistor, respectively. For example, in the present embodiment, the first transparent electrode 105 and the second transparent electrode 106 are both negative, and the transparent electrode 104 on the first substrate is positive. At this time, a vertical electric field 301 (which is directed from the transparent electrode on the first substrate to the first transparent electrode and the second transparent electrode on the second substrate) is generated in the control unit. Under the effect of the vertical electric field, the liquid crystal molecules 302 in the PDLC layer 103 rotates to a direction perpendicular to the first substrate 101 and the second substrate 102, so that the PDLC film structure becomes the transmission state.

Figure 4:
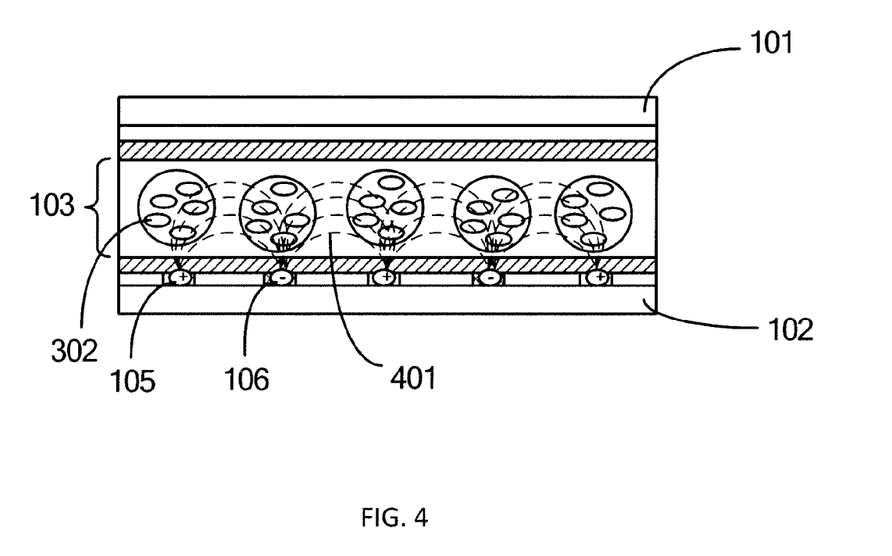
FIG. 4 is an operation principle diagram of a PDLC film structure provided by an embodiment of the present invention upon the PDLC film structure being turned off.
Figure 5:
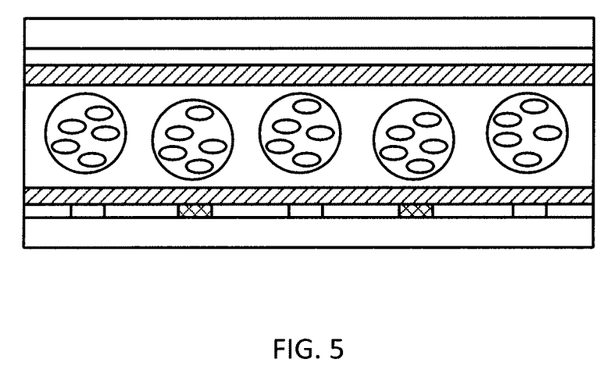
FIG. 5 is an original state of a PDLC film structure provided by an embodiment of the present invention t upon the PDLC film structure being not applied with voltage.

When the PDLC film structure is turned off, as illustrated in FIG. 4, the transparent electrode on the first substrate is firstly de-energized (i.e., stop supplying power thereto), then the first transparent electrode 105 and the second transparent electrode 106 are controlled to have opposite polarities by using the first thin film field effect transistor and the second thin film field effect transistor, respectively. In this embodiment, the first transparent electrode 105 is positive, and the second transparent electrode 106 is negative. At this time, a lateral electric field 401 is generated between the first transparent electrode and the second transparent electrode, so that the liquid crystal molecules 302 of the PDLC layer 103 are returned to a scattering state. As illustrated in FIG. 5, then the first transparent electrode 105 and the second transparent electrode 106 are de-energized.

Figure 6:
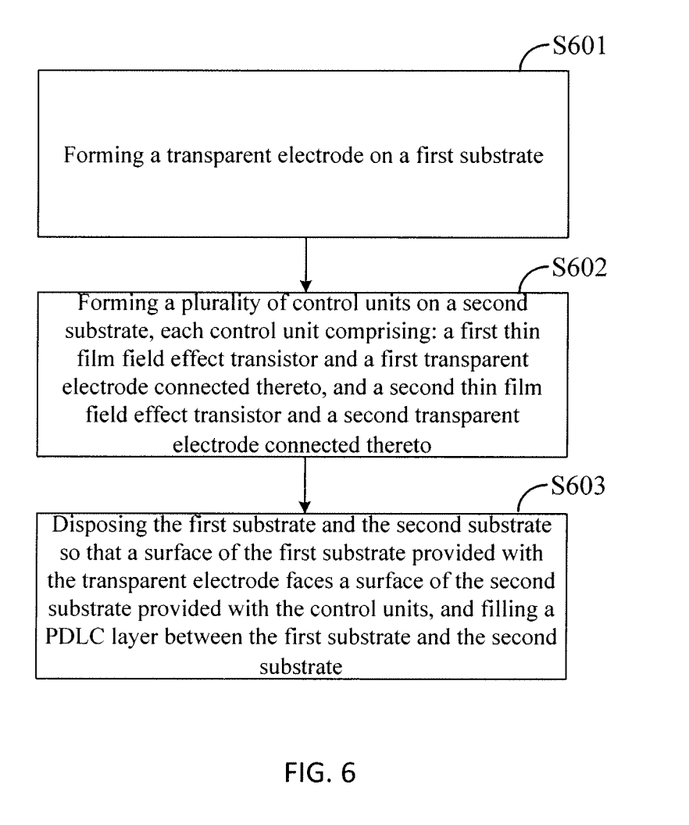
FIG. 6 is a flowchart of a manufacturing method of a PDLC film structure provided by an embodiment of the invention.

Based on the same inventive concept, the present invention also provides a method for manufacturing a PDLC film structure, as illustrated in FIG. 6, the method comprises the steps of:

S601, forming a transparent electrode on a first substrate;

S602, forming a plurality of control units on a second substrate, each control unit comprising: a first thin film field effect transistor and a first transparent electrode connected thereto, and a second thin film field effect transistor and a second transparent electrode connected thereto;

S603, disposing the first substrate and the second substrate so that a surface of the first substrate provided with the transparent electrode faces a surface of the second substrate provided with the control units, and filling a PDLC layer between the first substrate and the second substrate.

For example, in the above step S602, forming the control unit on the second substrate can be achieved by the following steps: in each of regions for forming the control units on the second substrate, forming two comb-shaped electrodes disposed opposing to each other with electrode lines as tooth portions of the two comb-shaped electrode arranged alternatively and separately; the two comb-shaped electrodes being used as a first transparent electrode and a second transparent electrode, respectively; and forming a first thin film field effect transistor connected to the first transparent electrode and a second thin film field effect transistor connected to the second transparent electrode in these regions.

Further, before the step S603, the method may further include: applying polyimide liquid on both the surface of the first substrate provided with the transparent electrode and the surface of the second substrate provided with the control units, and solidifying the polyimide liquid so as to form polyimide films; and rubbing surfaces of the polyimide film so as to form alignment films.

Figure 7:
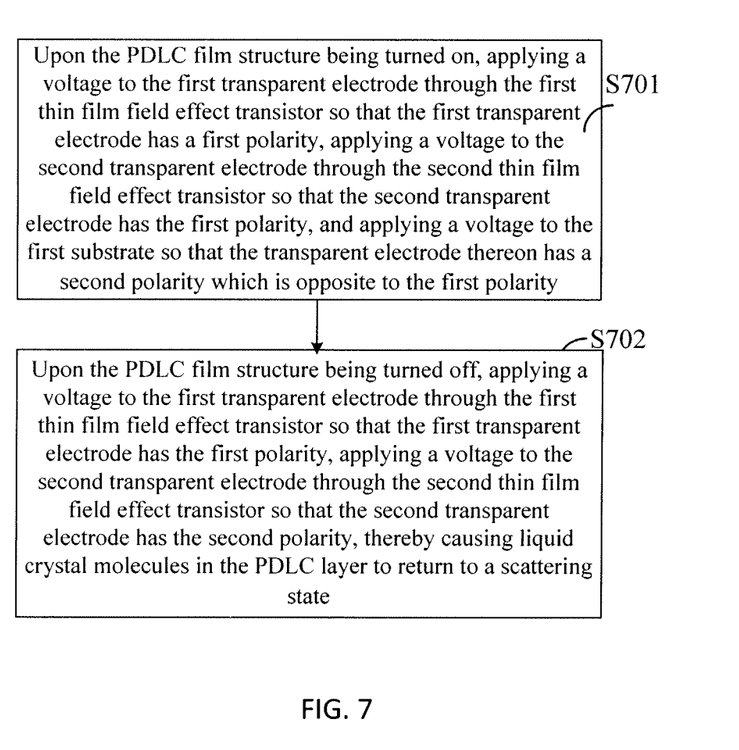
FIG. 7 is a flowchart of a controlling method of a PDLC film structure provided by an embodiment of the invention.

Based on the same inventive concept, an embodiment of the present invention also provides a controlling method of a PDLC film structure, as illustrated in FIG. 7, the method comprises the steps of:

S701, upon the PDLC film structure being turned on, applying a voltage to the first transparent electrode through the first thin film field effect transistor so that the first transparent electrode has a first polarity, applying a voltage to the second transparent electrode through the second thin film field effect transistor so that the second transparent electrode has the first polarity, and applying a voltage to the first substrate so that the transparent electrode thereon has a second polarity which is opposite to the first polarity;

S702, upon the PDLC film structure being turned off, applying a voltage to the first transparent electrode through the first thin film field effect transistor so that the first transparent electrode has the first polarity, applying a voltage to the second transparent electrode through the second thin film field effect transistor so that the second transparent electrode has the second polarity, thereby causing liquid crystal molecules in the PDLC layer to return to a scattering state.

For example, upon the PDLC film structure being turned on, a vertical electric field is generated along a direction perpendicular to the first substrate and the second substrate, and liquid crystal molecules in the PDLC layer are aligned along the direction under the effect of the vertical electric field so as to form a transmission state.

For example, upon the PDLC film structure being turned off, the transparent electrode on the first substrate is de-energized.

For example, after liquid crystal molecules in the PDLC layer returns to the scattering state, the first and second transparent electrodes are de-energized.

Embodiments of the invention provide a PDLC film structure, its manufacturing method and controlling method. By adding a second thin film field effect transistor and a second transparent electrode connected thereto to each control unit on the second substrate of the PDLC film structure, upon the PDLC being turned on, the first transparent electrode and the second transparent electrode are controlled to have the same polarity, which is opposite to the polarity of the transparent electrode on the first substrate, by using the first thin film field effect transistor and the second thin film field effect transistor, respectively; upon the first substrate being powered off, the first transparent electrode controlled by the first thin film field effect transistor has a polarity opposite to that of the second transparent electrode controlled by the second thin film field effect transistor, so that the liquid crystal molecules in the PDLC layer is returned to the scattering state. That is to say, when the first substrate is de-energized, a lateral electric field can be generated between the first and second transparent electrodes on the second substrate, so that the liquid crystal layer with a relatively long fall time can be returned to the scattering state more faster, which in turn reduces the overall response time of the liquid crystal. Thereby, the problem of a long time for the liquid crystal molecules returning from the transmission state to the scattering state in the conventional PDLC film structures can be solved.

Further, an embodiment of the present invention also provides a PDLC device comprising the above PDLC film structure, and the PDLC device is, for example, a display. For example, each of the control units in the PDLC film structure may correspond to a pixel on the display, and the light transmittance of each pixel can be controlled by controlling each control unit, so as to perform displaying.

The foregoing are merely exemplary embodiments of the invention, but are not used to limit the protection scope of the invention. The protection scope of the invention shall be defined by the attached claims.

What is claimed is:

1. A polymer dispersed liquid crystal (PDLC) film structure, comprising:
   a first substrate and a second substrate disposed facing each other; and
   a PDLC layer filled between the first substrate and the second substrate,
   wherein a transparent electrode is provided on a surface of the first substrate which faces the second substrate, and
   a plurality of control units are provided on a surface of the second substrate which faces the first substrate, each control unit comprising a first thin film field effect transistor and a first transparent electrode connected thereto, and a second thin film field effect transistor and a second transparent electrode connected thereto, wherein
   the control units are configured so that, upon the PDLC film structure being turned on, the first transparent electrode and the second transparent electrode are controlled to have a same polarity, which is opposite to that of the transparent electrode on the first substrate, by using the first thin film filed effect transistor and the second thin film field effect transistor, respectively; and upon the PDLC film structure being turned off, the first transparent electrode and the second transparent electrode are controlled to have different polarities by using the first thin film filed effect transistor and the second thin film field effect transistor, respectively, causing liquid crystal molecules in the PDLC layer to return to a scattering state.

2. The PDLC film structure according to claim 1, wherein each of the first transparent electrode and the second transparent electrode is a comb-shaped electrode,
   the first transparent electrode and the second transparent electrode are arranged opposing to each other, and comb tooth portions of each of the first transparent electrode and the second transparent electrode extending into between comb tooth portions of the other transparent electrode of the first transparent electrode and the second transparent electrode, and
   the comb tooth portions of the first transparent electrode and the comb tooth portions of the second transparent electrode are alternately and separately arranged.

3. The PDLC film structure according to claim 1, further comprising:
   alignment films disposed between the first substrate and the PDLC layer, and between the second substrate and the PDLC layer.

4. The PDLC film structure according to claim 1, wherein the plurality of control units are disposed on the second substrate in a manner of two-dimensional matrix, and the transparent electrode on the first substrate corresponds to all of the control units disposed on the second substrate.

5. A manufacturing method of a polymer dispersed liquid crystal (PDLC) film structure, comprising:
   forming a transparent electrode on a first substrate;
   forming a plurality of control units on a second substrate, each control unit comprising: a first thin film field effect transistor and a first transparent electrode connected thereto, and a second thin film field effect transistor and a second transparent electrode connected thereto;
   disposing the first substrate and the second substrate so that a surface of the first substrate provided with the transparent electrode faces a surface of the second substrate provided with the control units, and filling a PDLC layer between the first substrate and the second substrate; wherein
   the control units are configured so that, upon the PDLC film structure being turned on, the first transparent electrode and the second transparent electrode are controlled to have a same polarity, which is opposite to that of the transparent electrode on the first substrate, by using the first thin film filed effect transistor and the second thin film field effect transistor, respectively; and upon the PDLC film structure being turned off, the first transparent electrode and the second transparent electrode are controlled to have different polarities by using the first thin film filed effect transistor and the second thin film field effect transistor, respectively, causing liquid crystal molecules in the PDLC layer to return to a scattering state.

6. The method according to claim 5, wherein forming the plurality of control units on the second substrate comprises:
   in each of regions for forming the control units on the second substrate, forming two comb-shaped electrodes disposed opposing to each other with comb tooth portions of each of the two comb-shaped electrodes extending into between comb tooth portions of the other comb-shaped electrode, the comb tooth portions of the two comb-shaped electrodes being alternately and separately arranged; the two comb-shaped electrodes being used as a first transparent electrode and a second transparent electrode, respectively; and forming a first thin film field effect transistor connected to the first transparent electrode and a second thin film field effect transistor connected to the second transparent electrode in these regions.

7. The method according to claim 5, wherein, before filling the PDLC layer between the first substrate and the second substrate, the method further comprises:
   applying polyimide liquid on both the surface of the first substrate provided with the transparent electrode and the surface of the second substrate provided with the control units, and solidifying the polyimide liquid so as to form polyimide films; and rubbing surfaces of the polyimide films so as to form alignment films.

8. The method according to claim 5, wherein the plurality of control units are disposed on the second substrate in a manner of two-dimensional matrix, and the transparent electrode on the first substrate corresponds to all of the control units disposed on the second substrate.

9. A controlling method of a polymer dispersed liquid crystal (PDLC) film structure, the polymer dispersed liquid crystal (PDLC) film structure comprising: a first substrate and a second substrate disposed facing each other; and a PDLC layer filled between the first substrate and the second substrate, wherein a transparent electrode is provided on a surface of the first substrate which faces the second substrate, and a plurality of control units are provided on a surface of the second substrate which faces the first substrate, each control unit comprising a first thin film field effect transistor and a first transparent electrode connected thereto, and a second thin film field effect transistor and a second transparent electrode connected thereto, wherein the method comprises:

upon the PDLC film structure being turned on, applying a voltage to the first transparent electrode through the first thin film field effect transistor so that the first transparent electrode has a first polarity, applying a voltage to the second transparent electrode through the second thin film field effect transistor so that the second transparent electrode has the first polarity, and applying a voltage to the first substrate so that the transparent electrode thereon has a second polarity which is opposite to the first polarity; and upon the PDLC film structure being turned off, applying a voltage to the first transparent electrode through the first thin film field effect transistor so that the first transparent electrode has the first polarity, applying a voltage to the second transparent electrode through the second thin film field effect transistor so that the second transparent electrode has the second polarity, thereby causing liquid crystal molecules in the PDLC layer to return to a scattering state.

10. The method according to claim 9, wherein, upon the PDLC film structure being turned on, a vertical electric field is generated along a direction perpendicular to the first substrate and the second substrate, and liquid crystal molecules in the PDLC layer are aligned along the direction under the effect of the vertical electric field so as to form a transmission state.

11. The method according to claim 9, wherein, upon the PDLC film structure being turned off, the transparent electrode on the first substrate is de-energized.

12. The method according to claim 9, wherein, after liquid crystal molecules in the PDLC layer returns to the scattering state, the first and second transparent electrodes are de-energized.

* * * * *